United States Patent [19]
Krüger

[11] Patent Number: 5,388,613
[45] Date of Patent: Feb. 14, 1995

[54] VALVE WITH PRESSURE COMPENSATION

[75] Inventor: Edmund Krüger, Lübeck, Germany

[73] Assignee: Drägerwerk AG, Lübeck, Germany

[21] Appl. No.: 173,662

[22] Filed: Dec. 22, 1993

[30] Foreign Application Priority Data

Jan. 13, 1993 [DE] Germany ............... 4300629

[51] Int. Cl.⁶ ............................................. F16K 1/44
[52] U.S. Cl. .................. 137/625.34; 137/625.36; 251/333
[58] Field of Search .............. 137/625.34, 625.36, 137/333

[56] References Cited

U.S. PATENT DOCUMENTS

| | | | |
|---|---|---|---|
| 1,033,204 | 7/1912 | Skinner | 137/625.34 |
| 2,014,968 | 9/1935 | Hughes | 137/625.34 X |
| 2,717,003 | 9/1955 | Jay et al. | 137/625.34 |
| 3,035,608 | 5/1962 | Ray | 137/625.36 |
| 5,168,898 | 12/1992 | Gottling et al. | 137/625.34 |

FOREIGN PATENT DOCUMENTS 786524  6/1935  France ............... 137/625.36

Primary Examiner—Arnold Rosenthal
Attorney, Agent, or Firm—McGlew and Tuttle

[57] ABSTRACT

A valve with pressure compensation via two valve bodies (9, 10), which are arranged on a connecting rod (11) in the same direction, and which come to lie on the corresponding valve seats (7, 8) in the closed position in the same direction via deforming zones. The tightness between the valve bodies and the corresponding valve seats is increased, and the closing force required for sealing is reduced by deforming zones located between the upper valve body (9) and the upper valve seat (7), as well as between the lower valve body (10) and the lower valve seat (8) which are designed as pressure pieces (14, 16) yielding differently to the closing force.

12 Claims, 2 Drawing Sheets

VALVE WITH PRESSURE COMPENSATION

FIELD OF THE INVENTION

The present invention pertains to a valve with pressure compensation via two valve bodies arranged on a connecting rod in the same direction in a valve housing, with outlet openings in the valve housing and with flange-like valve seats at the outlet openings, on which the valve bodies come to lie via deforming zones in the same direction in the closed position, and with a pressure space enclosed by the valve bodies and the inner surface of the valve housing.

BACKGROUND OF THE INVENTION

A valve of this class has become known from German Utility Patent No. DE-GM 84 25 137. This prior-art valve has valve bodies arranged in the same direction in a valve housing at a connecting rod, and these valve bodies come to lie on flange-like valve seats in the valve housing in the closed position in the same direction. Elastomeric sealing rings, which seal the flow channels leading from the interior space of the valve housing to the outside via the valve seats in the closed position of the valve bodies, are provided between the valve seats and the valve bodies.

It is disadvantageous in the prior-art valve that tolerances of the double fit between the valve bodies and the corresponding valve seats can be compensated only partially via the elasticity of the sealing rings in the closed position. It may happen due to the rigid coupling of the valve bodies via the connecting rod that even though a valve body is in contact with the valve seat belonging to it, a leakage flow develops between the other valve body and the valve seat. This leakage flow can be stopped only via a closing force of corresponding strength acting on the valve bodies.

A demand oxygen system, which has a valve body on a valve seat in a valve housing and a compensation piston rigidly connected to the valve body for admission pressure compensation, has become known from Swiss Patent No. CH-PS 466 051. A control lever, which is in contact with a control diaphragm of the demand oxygen system, is mounted in the valve housing in an articulated manner, and it actuates the compensation piston and the valve body during a deflection of the control diaphragm, as a result of which pressurized gas can flow into the control diaphragm space formed by the control diaphragm and the inner space of the valve housing.

It is disadvantageous in the prior-art metering valve that a substantial static friction must be overcome during the actuation of the compensation piston, because the compensation piston is accommodated axially displaceably in a hole of the valve housing with an O-ring seal. The static friction leads to reduced sensitivity of response of the demand oxygen system. Even though it would be possible to compensate the static friction to a certain extent by a larger control diaphragm, doing so would considerably interfere with the ease of handling of the demand oxygen system.

SUMMARY AND OBJECTS OF THE INVENTION

The basic object of the present invention is to improve a valve of the above-described class such that the tightness between the valve bodies and the corresponding valve seats is increased and the closing force is reduced to a minimum.

This object is attained by the deforming zones located between the upper valve body and the upper valve seat, on the one hand, and between the lower valve body and the lower valve seat, on the other hand, being designed as pressure pieces yielding differently, or different amounts, to the closing force.

The advantage of the present invention is essentially the fact that due to the different elasticities of the pressure pieces forming the deforming zones between the valve bodies and valve seats, the clearance that has developed because of the double fit can be compensated, and the closing force can be markedly reduced. The deforming zone is defined as the area between the valve body and the valve seat, in which the two come into contact with one another in the closed position in a positive-locking manner, and which permits the deformation. The deforming zone between the valve seat and the valve body may be designed such that only the valve seat, or at least part of it, or only the valve body, or at least part of it, is designed as a resilient component, or both the valve seat, or at least part of it, and the valve body, or at least part of it, are designed as elastic components, or an elastic sealing element is located as a pressure piece between a fixed valve seat and a fixed valve body. Combinations of elastic/fixed valve seat/valve body and an elastic sealing element are also conceivable. A difference in elasticity occurs when different displacements are present because of elastic or plastic deformations between the respective valve bodies and valve seats at equal force being applied by a valve body to the corresponding valve seat in the closed position. The closing force required for tightness may be generated by, e.g., a spring, by which the valve bodies are pressed against the corresponding valve seats in the static resting position.

According to one advantageous embodiment of the invention, one of the valve bodies is designed as an elastomeric cone with a lip attached in a manner of a cantilever, acting as a pressure piece. The other valve body, also acting as a pressure piece, has elastomeric coating which is flatly supported by a support. The upper and lower valve seat may also be designed as an elastomeric valve lip and the upper and lower valve seat may be designed as an elastomeric valve collar with valve seat elements acting as the pressure pieces.

The connecting rod may also be formed of an upper rod part and a lower rod part which are connected to one another by means of a spring element that changes the distance between the valve bodies. The valve body or the valve seat may also be provided an adjusting means that changes distance between the valve bodies and/or changes the distance between the valve seats. The adjusting means may be an adjusting screw accommodating the lower valve seat and/or the upper valve seat.

The different elasticity of the deforming zones is advantageously achieved by one of the valve bodies being designed as an elastomeric cone with a lip attached to a bead in the manner of a cantilever, acting as a pressure piece, and by the other valve body having as a pressure piece an elastomeric coating, which is flatly or flushly supported by a support. The different elasticity of the elastomeric cone compared with a metallic cone with an elastomeric coating in flat, or flush contact with it is achieved due to the fact that only the part of the lip projecting from the point of attachment, namely, the bead, i.e., the elastic part of the lip, lies on the corresponding valve seat. The conical geometry of the valve bodies also offers the advantage that a high gas flow rate can be metered at a relatively small opening path and the static frictional forces between the valve body and the valve seat are partially compensated by the injector action during gas metering.

In another advantageous embodiment, the upper/lower valve seat is designed as an elastic elastomeric valve lip, and the lower/upper valve seat is designed as an elastomeric valve collar. The corresponding valve bodies may also be designed as elastic valve bodies or as fixed plastic cones. Due to the elasticity of the valve lip or of the valve collar, the closing force acting on the valve bodies is also supported by the supply pressure occurring in the pressure space.

The task is also accomplished, in an advantageous manner, by the fact that the connecting rod consists of an upper rod part and a lower rod part, wherein the rod parts are connected by means of an elastomeric disk acting as a spring element, which changes the distance between the valve bodies. Instead of an elastomeric disk, it is also possible to use as spring elements, e.g., a coil spring or an assembly of disk springs.

Another advantageous solution according to the invention is that at least one valve body and/or one valve seat has an adjusting means which changes the distance between the valve bodies and/or the valve seats.

The adjusting means is advantageously designed as an adjusting screw accommodating the lower valve seat or the upper valve seat.

In one advantageous use of the valve according to the present invention, as a metering valve is provided on a demand oxygen system, in which, e.g., the lower valve body can be brought into the open position by a control lever that is connected to a control diaphragm of the demand oxygen system. The valve according to the present invention is characterized by particularly good tightness, weak closing force, and weak opening force, and the opening force can also be attributed to the weak friction between the valve bodies and the valve seats. The friction in conical valve bodies is also reduced by the injector forces acting during the metering of gases.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
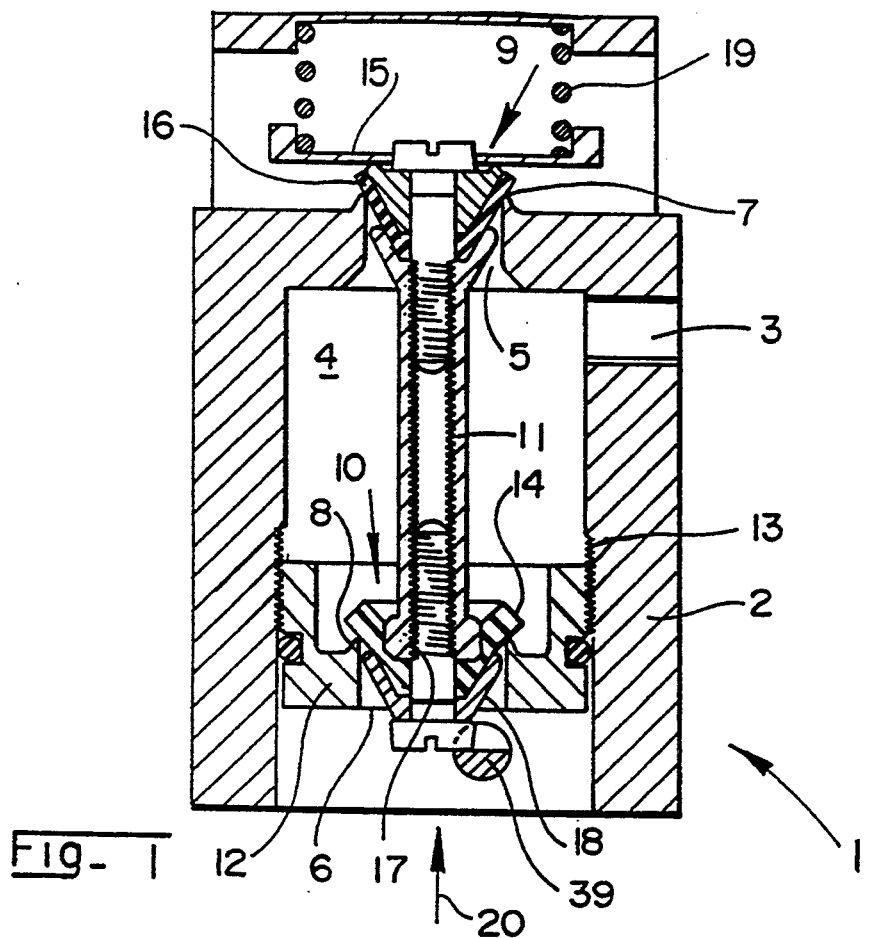
FIG. 1 is a longitudinal sectional view of a first valve.

FIG. 1 shows a first valve 1 with a first valve housing 2, which has a supply opening 3 for pressurized gas. A pressure space 4, to which the pressurized gas is admitted, and from which the pressurized gas can flow off via an upper outlet opening 5 and a lower outlet opening 6, is formed by the inner surface of the first valve housing 2. An upper valve seat 7 is located at the upper outlet opening 5, and a lower valve seat 8 is located at the lower outlet opening 6, and an upper valve cone 9, acting as an upper valve body, or head and an elastomeric cone 10, acting as a lower valve body, or head lie on the respective valve seats.

The valve seats 7, 8 with the upper valve cone 9 and with the elastomeric cone 10 are arranged in the first valve housing 2 opposite each other and in the same direction, and the upper valve cone 9 is connected to the elastomeric cone 10 via a connecting rod 11. The lower valve seat 8 is located at an adjusting screw 12, which can be screwed into a threaded section 13 in the first valve housing 2. The upper valve cone 9 has a conical support 15, which is provided with a deforming means as an elastomeric coating 16. The elastomeric cone 10 is another deforming means and consists of a conical lip 14, which is attached to a bead 17 in the manner of a cantilever by means of a clamping sleeve 18. When the elastomeric cone 10 lies on the lower valve seat 8, the part of the lip 14 projecting over the bead 17 lies on the lower valve seat 8.

The upper valve cone 9 and—via the connecting rod 11—the elastomeric body 10 are fixed in the static resting position on the corresponding valve seats 7, 8 by means by a spring 19, which generates the closing force and acts on the upper valve cone 9. The closing force acting in the static resting position can be changed by the rigidity of the spring 19, i.e., depending on the selected design of the valve bodies and of the valve seats, and taking into account the admission pressure acting in the pressure space 4, the closing force of the spring 19 can be designed to be just strong enough to prevent leakage flow from occurring.

During operation, the pressure space 4 is connected via the supply opening 3 to a pressurized gas source (not shown in FIG. 1), as a result of which directed forces act on the upper valve cone 9 and on the elastomeric cone 10, which are in equilibrium if the areas of the upper outlet opening 5 and of the lower outlet opening 6 are equal, i.e., there is complete admission pressure compensation.

The fit clearance of the double valve cone arrangement is compensated by the deforming zones or means in the form of the elastomeric coating 16 and of the lip 14 acting as pressure pieces of different elasticity which deforming zones are located between the upper valve cone 9 and the upper valve seat 7, on the one hand, and between the elastomeric cone 10 and the lower valve seat 8, on the other hand. The different elasticity is achieved by the coating 16 being flatly supported by the support 15 at the upper valve cone 9, while the lip 14 at the elastomeric body 10 lies flexibly on the lower valve seat 8. Preadjustment of the valve seats 7, 8 in relation to one another can additionally be performed by means of the adjusting screw 12. The open position of the first valve 1 is reached by rotating a semicircularly flattened pivot pin 39, which is part of the control lever not shown in FIG. 1. The elastomeric cone 10 is now displaced along an arrow 20. The closing force of the spring 19 must essentially be overcome at the transition from the closed position into the open position.

The special advantages of the first valve 1 according to the present invention are the combination of a high degree of tightness and weak closing force due to the different elasticities of the cones 9, 10 and weak opening force due to low friction between the cones 9, 10 and the valve seats 7, 8 because of the linear contact surfaces and an injector action supporting the opening movement during the metering of gas. Experiments have shown that such a valve can be used particularly advantageously as a metering valve in a demand oxygen system, because operation of the valve with weak opening and closing forces, as well as high degree of tightness are required here.

Figure 2:
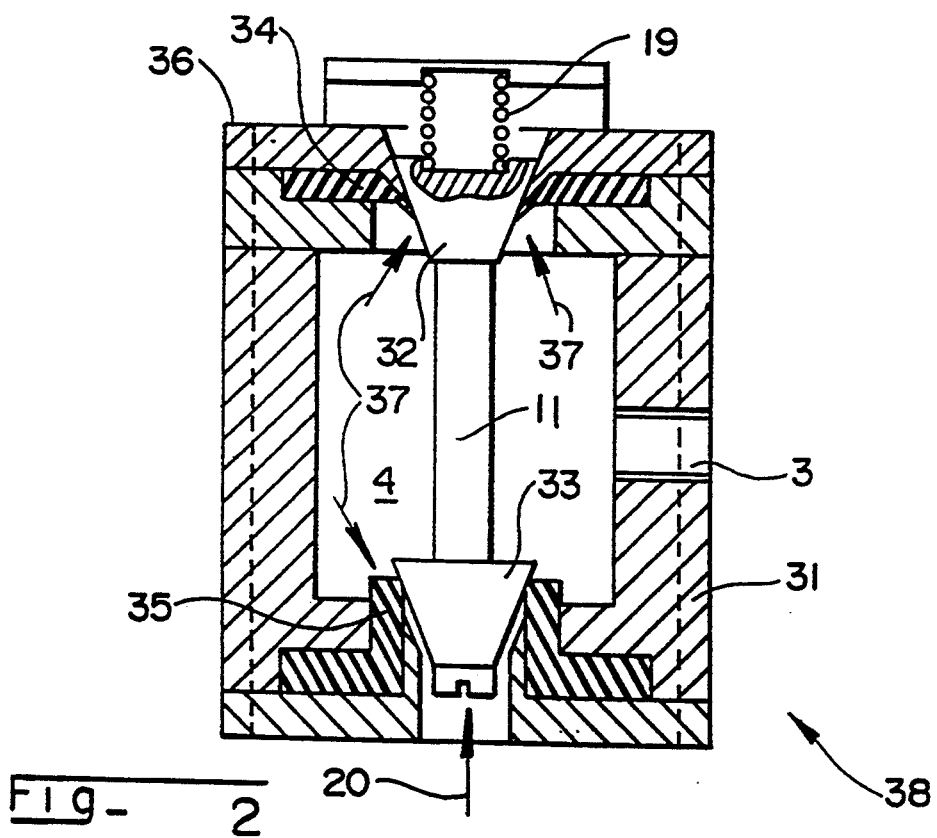
FIG. 2 is a longitudinal sectional view of a second valve.

In the exemplary embodiment of a second valve 38 shown in FIG. 2, an upper metallic cone 32, acting as an upper valve body, and a lower metallic cone 33, acting as a lower valve body, are arranged in a second valve housing 31, and the cones come into contact with an elastomeric valve lip 34 acting as an upper valve seat, and with an elastomeric valve collar 35 acting as a lower valve seat.

Identical components are designated by the same reference numerals as in FIG. 1. The valve lip 34 is attached to the second valve housing 31 by means of a clamping plate 36 such that only the edge pointing toward the center, namely, the part of the valve lip 34 pointing into the outlet opening 5, is elastically deformable. The metallic cones 32, 33 are rigidly connected to one another by means of the connecting rod 11.

The difference from the exemplary embodiment according to FIG. 1 is that the valve seats are designed as the valve lip 34 here, and the valve collar 35 is also designed, to a certain extent, as an elastic valve collar. The valve lip 34 and the valve collar 35 are pressed against the metallic cones 32, 33 under the action of the pressure occurring in the pressure space 4, as a result of which the closing force is supported, and tightness is additionally improved. The fit clearance is compensated essentially by the elasticity of the valve lip 34 in the exemplary embodiment according to FIG. 2. The pressure forces acting in the pressure space 4 are illustrated by the arrows 37. Pressurized gas is metered by the pressure acting on the lower metallic cone 33 along the arrow 20.

Figure 3:
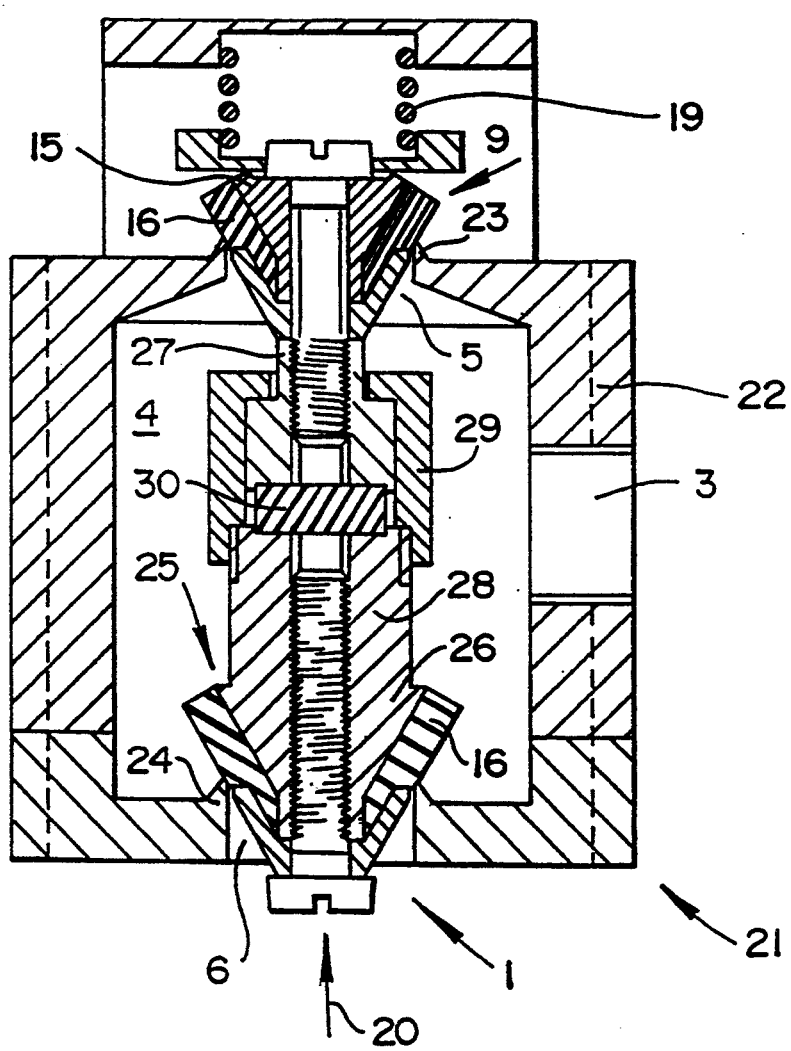
FIG. 3 is a longitudinal sectional view of a third valve.

FIG. 3 shows a third valve 21 as another exemplary embodiment of the present invention, with a third valve housing 22, with an upper valve crater 23 acting as an upper valve seat, with a lower valve crater 24 acting as a lower valve seat, with the upper valve cone 9, and with a lower valve cone 26. The lower valve cone 26 comprises a corresponding elastomeric coating 16, as does the upper valve cone 9. Instead of the connecting rod 11 according to FIG. 1, an upper rod part 27 is provided at the upper valve cone 9, and a lower rod part 28 is provided at the lower valve cone 25, and the rod parts are connected to one another by means of a sleeve 29 and an elastomeric disk 30 acting as a spring element. Axial displacement of the rod parts 27.28 in relation to one another is possible by means of the sleeve 29 and the disk 30. Identical components are designated by the same reference numerals as in FIG. 1. The fit clearance of the double piston valve arrangement is compensated here by the axial displaceability of the rod parts 27, 28 in relation to one another, wherein the lower valve cone 25 is pressed against the lower valve crater 24 under the action of the pressure in the valve space 4. Linear contact of the valve cones 9, 25 is achieved due to the valve craters 23, 24, which leads to a further reduction of friction between the valve cones 9, 25 and the valve craters 23, 24.

While specific embodiments of the invention have been shown and described in detail to illustrate the application of the principles of the invention, it will be understood that the invention may be embodied otherwise without departing from such principles.

What is claimed is:

1. A valve with pressure compensation, comprising:
   a first valve body;
   a second valve body;
   a valve housing, said first valve body and said second valve body being arranged in said valve housing acting in a common direction;
   outlet openings provided in said valve housing, said outlet openings having flange-like valve seats with said first valve body being seated in a first valve seat and said second valve body being seated in a second valve seat in a closed position, said valve bodies and an inner surface of said valve housing defining a pressure space;
   a first deforming zone located at contact points between said first valve body and said first valve seat and a second deforming zone located at contact points between said second valve body and said second valve seat, said deforming zones being formed as pressure pieces with said first deforming zone yielding differently to a closing force than said second deforming zone, said first valve body is formed as an elastomeric cone with a lip acting as a pressure piece, said lip being attached to said elastomeric cone in a manner of a cantilever, said second valve body having an elastomeric coating at said pressure piece, said elastomeric coating being flatly disposed on a support.

2. A valve with pressure compensation according to claim 1, wherein:
   said connecting rod is formed by an upper rod part and a lower rod part, said upper rod part and said lower rod part being connected to one another by spring element means for changing a distance between said first valve body and said second valve body.

3. A valve with pressure compensation according to claim 1, further comprising:
   adjusting means connected to one of said first valve body, said second valve body, said first valve seat and said second valve seat for changing a distance between said valve bodies and said valve seats.

4. A valve according to claim 3, wherein:
   said adjusting means includes an adjusting screw accommodating said lower valve seat and/or said upper valve seat.

5. A valve in accordance with claims 1, wherein:
   said first deforming zone yields a greater amount than said second deforming zone.

6. A valve in accordance with claims 1, wherein:
   said first deforming zone has an elasticity different than said second deforming zone.

7. A double seat valve comprising:
   a valve housing defining a first opening and a second opening, said housing having a first seat at said first opening and a second seat at said second opening;
   a first valve head positioned in said first opening of said valve housing and cooperating with said first valve seat to block and open communication between said first opening;
   a second valve head positioned in said second opening of said valve housing and cooperating with said second valve seat to block and open communication between said second opening, said first valve head and said second valve head acting in substantially a same direction;

a first deforming means positioned between said first valve seat and said first valve head, and for compensating and sealing a fit clearance between said first valve seat and said first valve head, Said first deforming means including an elastomeric lip attached to said first valve head in a manner of cantilever;

a second deforming means positioned between said second valve seat and said second valve head for compensating and sealing a fit clearance between said second valve seat and said second valve head, said second deforming means includes an elastomeric coating positioned flush on said second valve head, said second deforming means being designed to deform to a different extent than said first deforming means.

8. A valve in accordance with claim 7, wherein:
said second deforming means is designed to have an elasticity different than an elasticity of said first deforming means.

9. A valve in accordance with claim 7, wherein:
said first deforming means deforms to a greater extent than said second deforming means;
said second deforming means deforms to a lesser extent than said first deforming means.

10. A valve in accordance with claim 7, wherein:
said first deforming means deforms to a lesser extent than said second deforming means;
said second deforming means deforms to a greater extent than said first deforming means.

11. A valve according to claim 7, further comprising: adjusting means connected to one of said first valve head, said second valve head, said first valve seat and said second valve seat for changing a distance between said valve heads and said valve seats.

12. A valve with pressure compensation, comprising:
a first valve body;
a second valve body;
a valve housing, said first valve body and said second valve body being arranged in said valve housing acting in a common direction;
outlet openings provided in said valve housing, said outlet openings having flange-like valve seats with said first valve body being seated in a first valve seat and said second valve body being seated in a second valve seat in a closed position, said valve bodies and an inner surface of said valve housing defining a pressure space;
a first deforming zone located at contact points between said first valve body and said first valve seat and a second deforming zone located at contact points between said second valve body and said second valve seat, said deforming zones being formed as pressure pieces with said first deforming zone yielding differently to a closing force than said second deforming zone, said first valve body is formed as an elastomeric cone with a lip acting as a pressure piece, said lip being attached to said elastomeric cone in a manner of a cantilever, said second valve body having an elastomeric coating at said pressure piece, said elastomeric coating being positioned flush on a support.

* * * * *